US012683734B2

(12) United States Patent
Zheng et al.

(10) Patent No.: US 12,683,734 B2
(45) Date of Patent: Jul. 14, 2026

(54) SYSTEMS AND METHODS FOR REPORTING INFORMATION OF REFERENCE SIGNALS

(71) Applicant: ZTE CORPORATION, Shenzhen (CN)

(72) Inventors: Guozeng Zheng, Shenzhen (CN); Chuangxin Jiang, Shenzhen (CN); Hao Wu, Shenzhen (CN); Zhaohua Lu, Shenzhen (CN); Huahua Xiao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 376 days.

(21) Appl. No.: 18/129,522

(22) Filed: Mar. 31, 2023

(65) Prior Publication Data

US 2023/0370222 A1 Nov. 16, 2023

Related U.S. Application Data

(63) Continuation of application No. PCT/CN2020/139119, filed on Dec. 24, 2020.

(51) Int. Cl.
H04B 7/00 (2006.01)
H04B 7/08 (2006.01)
H04L 5/00 (2006.01)

(52) U.S. Cl.
CPC ........... H04L 5/0048 (2013.01); H04B 7/088 (2013.01)

(58) Field of Classification Search
CPC ..... H04L 5/0048; H04B 7/088; H04B 7/0617; H04W 24/10
See application file for complete search history.

(56) References Cited

U.S. PATENT DOCUMENTS

| | | | | |
|---|---|---|---|---|
| 2017/0163318 | A1* | 6/2017 | Byun | ................... H04B 7/0695 |
| 2022/0140874 | A1* | 5/2022 | Vemuri | ............... H04B 7/0413 |
| | | | | 375/267 |
| 2022/0174641 | A1* | 6/2022 | Cha | ......................... H04L 5/005 |
| 2023/0276530 | A1* | 8/2023 | Jeon | .................... H04W 36/305 |
| | | | | 370/329 |
| 2024/0015759 | A1* | 1/2024 | Koskela | ............... H04B 7/0695 |

FOREIGN PATENT DOCUMENTS

| | | | | |
|---|---|---|---|---|
| EP | 3476059 | B1 * | 12/2020 | ............ H04W 24/10 |
| WO | WO-2018/002154 | A1 | 1/2018 | |
| WO | WO-2018/145630 | A1 | 8/2018 | |
| WO | WO-2019/048038 | A1 | 3/2019 | |

OTHER PUBLICATIONS

Jeon et al (U.S. Appl. No. 63/062,412, filed Aug. 6, 2020, further published as US Pub. No. 2023/0276530).*

(Continued)

*Primary Examiner* — Lakeram Jangbahadur
(74) *Attorney, Agent, or Firm* — Foley & Lardner LLP

(57) ABSTRACT

A wireless communication method includes sending, by a wireless communication device to a wireless communication node, a message indicating reception information of a first one of a plurality of downlink reference signals, wherein the reception information comprises at least one of reception beam information or reception timing information.

14 Claims, 7 Drawing Sheets

(56) References Cited

OTHER PUBLICATIONS

CATT: "Details of downlink beam management" 3GPP TSG RAN WG1 Meeting #88bis; R1-1704551; Apr. 7, 2017; Spokane, USA (8 pages).

Huawei et al.: "CSI-RS design for beam management" 3GPP TSG RAN WG1 Meeting #88bis; R1-1704235; Apr. 7, 2017; Spokane, USA (9 pages).

International Search Report and Written Opinion for PCT Appl. No. PCT/CN2020/139119, mailed Sep. 28, 2021 (8 pages).

Extended European Search Report for EP Appl. No. 20966503.3, dated Feb. 15, 2024 (8 pages).

Huawei et al., "Further details on beam indication", 3GPP TSG RAN WG1 Meeting #91, R1-1719806, Dec. 1, 2017, Reno, USA (12 pages).

* cited by examiner

141

110

143

131

142

132

$\alpha_1$ $\alpha_2$ $\alpha_3$

Reference direction

120

100

| Angle information | {azimuth angle=X1; elevation angle=Y1} | {azimuth angle=X2; elevation angle=Y2} | {azimuth angle=X3; elevation angle=Y3} | ... |
|---|---|---|---|---|
| Beam Index | 1 | 2 | 3 | ... |

FIG. 2

| Angle information | {azimuth angle=X1; elevation angle=Y1} | {azimuth angle=X2; elevation angle=Y2} | {azimuth angle=X3; elevation angle=Y3} | ... |
|---|---|---|---|---|
| Angle information for different repetitions | first repetition | second repetition | third repetition | ... |

FIG. 3

| Reference signals | Reception time |
|---|---|
| RS 1 | $T_1$ |
| RS 2 | $T_2$ |
| RS 3 | $T_3$ |
| ... | ... |

FIG. 4

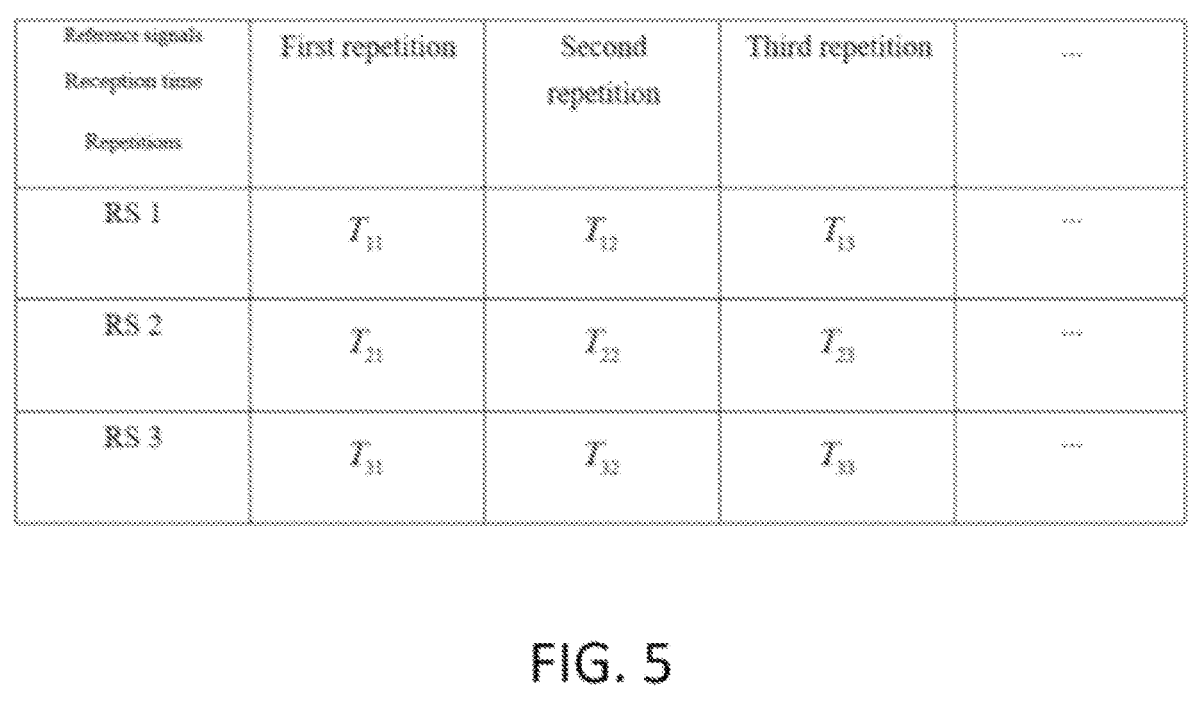

| Reference signals Reception time Repetitions | First repetition | Second repetition | Third repetition | ... |
|---|---|---|---|---|
| RS 1 | $T_{11}$ | $T_{12}$ | $T_{13}$ | ... |
| RS 2 | $T_{21}$ | $T_{22}$ | $T_{23}$ | ... |
| RS 3 | $T_{31}$ | $T_{32}$ | $T_{33}$ | ... |

FIG. 5

| | |
|---|---|
| Relative timing difference between third repetition of RS2 and the reference | $T_{33} - T_{23}$ |
| Relative timing difference between first repetition of RS1 and the reference | $T_{11} - T_{23}$ |
| Relative timing difference between third repetition of RS1 and the reference | $T_{13} - T_{23}$ |
| ... | ... |

FIG. 6

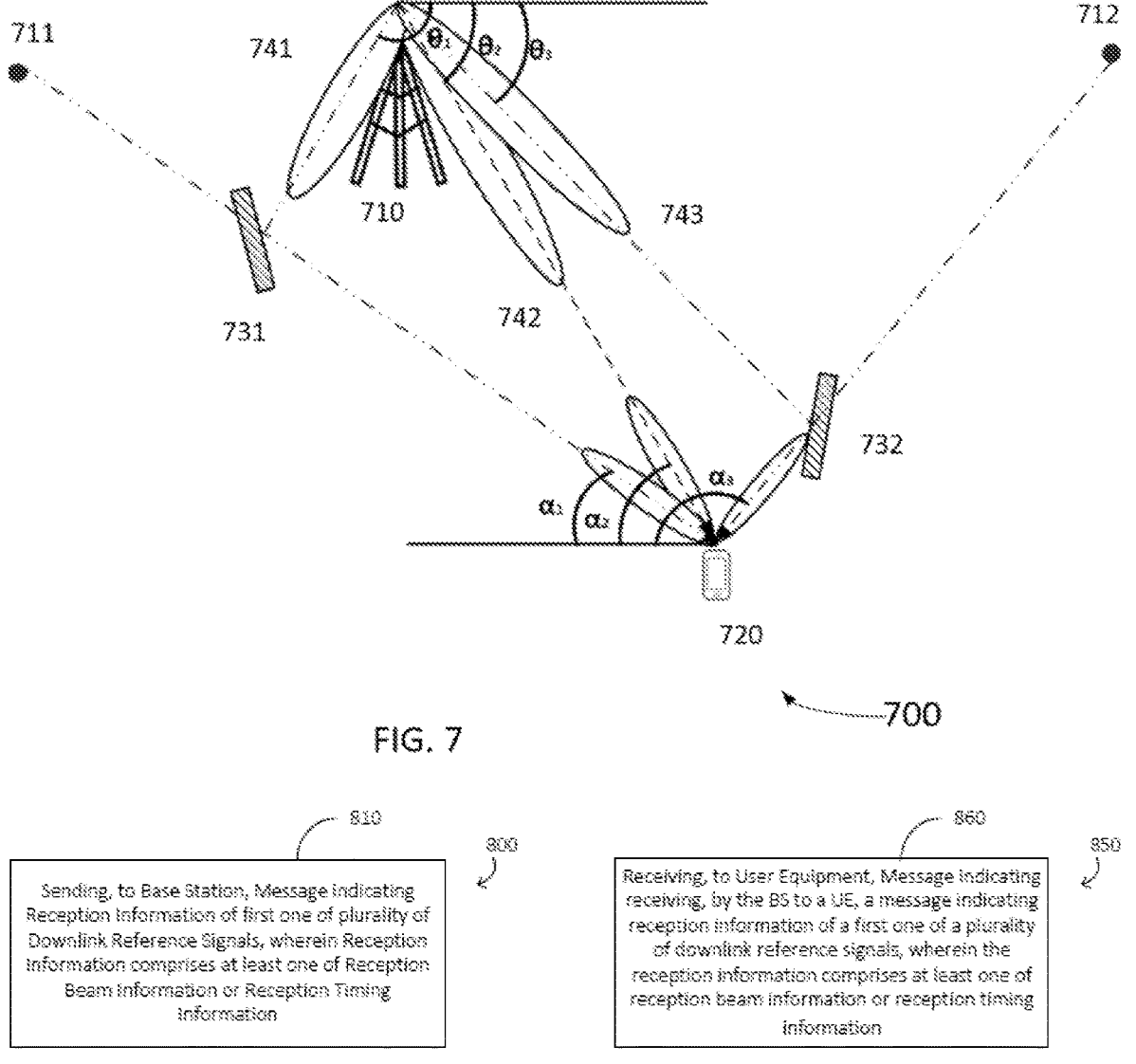

FIG. 7

Sending, to Base Station, Message Indicating
Reception Information of first one of plurality of
Downlink Reference Signals, wherein Reception
Information comprises at least one of Reception
Beam Information or Reception Timing
Information

FIG.8A

Receiving, to User Equipment, Message indicating
receiving, by the BS to a UE, a message indicating
reception information of a first one of a plurality
of downlink reference signals, wherein the
reception information comprises at least one of
reception beam information or reception timing
information

FIG.8B

SYSTEMS AND METHODS FOR REPORTING INFORMATION OF REFERENCE SIGNALS

CROSS-REFERENCE TO RELATED APPLICATION

This application claims the benefit of priority under 35 U.S.C. § 120 as a continuation of International Patent Application No. PCT/CN2020/139119, filed on Dec. 24, 2020, the disclosure of which is incorporated herein by reference in its entirety.

TECHNICAL FIELD

The disclosure relates generally to wireless communications and, more particularly, to systems and methods for reporting information of reference signals.

BACKGROUND

In current 5G NR, there is support only for rough information of reception beam on the terminal side, where the reception beam is unknown to the network side. However, if the terminal is equipped with massive antennas, it is possible for the terminal to virtualize many finer reception beams. In these situations, it is important for the terminal to provide more detailed reception beam information to improve communication. In addition, current communication systems do not support measuring or reporting timing information in beam sweeping/reporting procedures, despite the timing information being beneficial for positioning.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some arrangements, User Equipment (UE) performs a method including sending, by the UE to a BS, a message indicating reception information of a first one of a plurality of downlink reference signals, wherein the reception information comprises at least one of reception beam information or reception timing information.

In other arrangements, BS performs a method including receiving, by the BS from a UE, a message indicating reception information of a first one of a plurality of downlink reference signals, wherein the reception information comprises at least one of reception beam information or reception timing information.

In other embodiments, a wireless communications apparatus comprising a processor and a memory, wherein the processor is configured to read code from the memory and implement a method including sending, by the wireless communications apparatus to a wireless communication node, a message indicating reception information of a first one of a plurality of downlink reference signals, wherein the reception information comprises at least one of reception beam information or reception timing information.

In other embodiments, a computer program product comprising a computer-readable program medium code stored thereupon, the code, when executed by a processor, causing the processor to implement a method including sending, by a wireless communication device to a wireless communication node, a message indicating reception information of a first one of a plurality of downlink reference signals, wherein the reception information comprises at least one of reception beam information or reception timing information.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 2 is a table showing angle information with a corresponding beam index, according to various embodiments.

FIG. 3 is a table showing angle information for different repetitions and the corresponding angle information for the reception beam, according to various embodiments.

FIG. 4 is a table showing reference signals and corresponding reception times, according to various embodiments.

FIG. 5 is a table showing reference signals and corresponding times for various repetitions, according to various embodiments.

FIG. 6 is a table showing relative timing differences between references signals and the reference, according to various embodiments.

FIG. 7 is a schematic diagram of a base station and a terminal in wireless communication, according to various embodiments.

FIG. 8A is a flowchart diagram illustrating an example wireless communication method for reporting information for reference signals, according to various embodiments.

FIG. 8B is a flowchart diagram illustrating another example wireless communication method for reporting information for reference signals, according to various embodiments.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
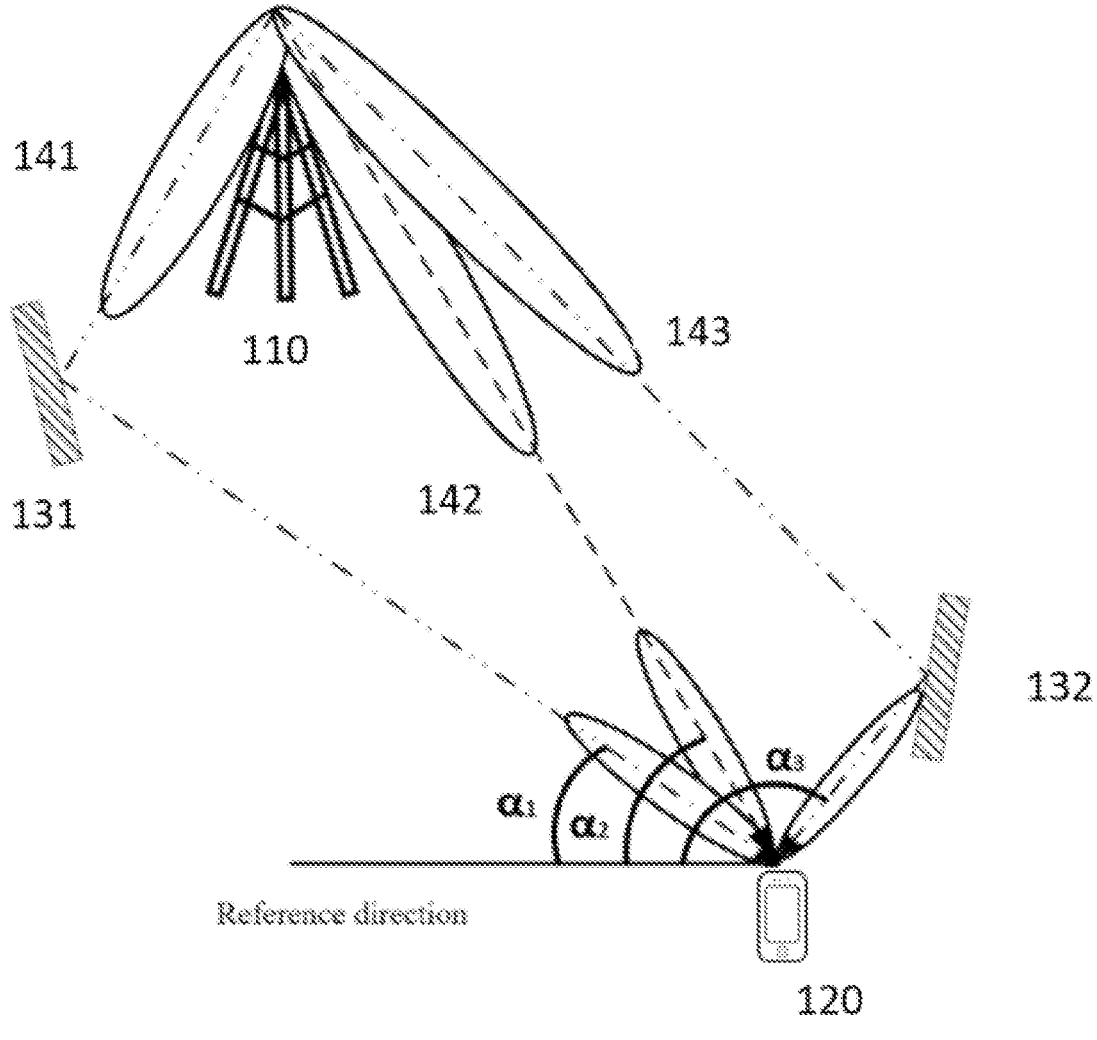
FIG. 1 is a schematic diagram of a base station and a terminal in wireless communication, according to various embodiments.

FIG. 1 is a schematic diagram of a Base Station (BS) 110 and a terminal 120 in wireless communication, according to an example embodiment. The BS 110 may be a network, and the terminal 120 may be User Equipment (UE). As shown in FIG. 1, the BS 110 transmits a first Reference Signal (RS) 141, a second RS 142, and a third RS 143 to the terminal 120. Some of the RS transmitted by the BS 110 may be reflected by reflectors. For example in FIG. 1, the first RS 141 is reflected by a first reflector 131 and the third RS 143 is reflected by a second reflector 132 before reaching the terminal 120. The terminal 120 uses different reception beams for receiving the RS, denoted $\alpha_1$ for the first RS 141, $\alpha_2$ for the second RS 142, and $\alpha_3$ for the third RS 143. Further, the terminal 120 may measure Reference Signal Received Power (RSRP) information and timing information upon receiving the different RS, and may feed reception information back to the BS 110. This reception information includes at least one of reception beam information, RSRP information (which is previously supported in current designs), and reception timing information.

As discussed above, the terminal can report reception beam information in the measurement report, according to various embodiments. In each of the various embodiments, the measurement report includes at least one of but not limited to: the identity of the reference signal, the repetition index information, beam index indication, angle information, or antenna group information (if the terminal is equipped with multiple antenna groups/panels/receiver branches). In the measurement report, the terminal may be expected to report multiple identities of reference signals and/or multiple repetition indices for the same reference signal.

In a first embodiment, the terminal reports the reception beam information explicitly in the measurement report. For an example involving a reference signal, the identity of the reference signal and the corresponding angle information are included in the corresponding measurement report. This angle information can be expressed by azimuth information and/or elevation angle information.

As used herein, azimuth angle information refers to the azimuth angle of the boresight direction from which the reference signal is received, while elevation angle information refers to the elevation angle of the boresight direction from which the reference signal is received. For a Global Coordinate System (GCS), the azimuth angle is measured counter-clockwise from geographical North, while the elevation angle is measure relative to zenith and positive to the horizontal direction (e.g., an elevation angle of 0° indicates the zenith, while an elevation angle of 90° indicates the horizon). For a Local Coordinate System (LCS), the azimuth angle is measured counter-clockwise from the x-axis of the LCS, while the elevation angle is measured relative to the z-axis of the LCS (e.g., an elevation angle of 0° indicates the z-axis, while an elevation angle of 90° indicates the x/y-axes). Determination of the x, y, and z-axes in LCS (i.e., the reference direction) can be pre-defined or determined by the terminal. In an embodiment, when a direction is defined/determined as a reference direction, the reference direction is that at which the azimuth angle is 0° and/or the elevation angle is 0°.

In a second embodiment, the network (e.g. a BS or an entity in core network) may provide assistance data to the terminal (i.e., UE) that includes a mapping between angle information and beam index information, wherein the angle information includes azimuth angle information and/or elevation angle information and wherein the beam index information includes indices mapped to different angle information. FIG. 2 is a table showing a mapping between angle information and beam index information, according to the second embodiment. In one example involving a reference signal, the identity of the reference signal and beam index indication are included in the measurement report. As shown in FIG. 2, if the beam index indication indicates a beam index is 2 for a reference signal in the measurement report, it means the terminal uses {azimuth angle=$X_2$; elevation angle=$Y_2$} to receive the reference signal.

In a third embodiment, when a reference signal is configured with repetitions over different time instants, different repetitions may be received by different reception angles (or reception direction, which can be expressed by azimuth angle and/or elevation angle). The linkage between different repetitions and different reception angles may be determined according to various methods. In a first method, the terminal (i.e., UE) decides which reception angle is used for each repetition, and the terminal reports at least one of 1) the identity of the reference signal; 2) repetition index (i.e., on which repetition the measurement is based); 3) an indication of the angle information that the terminal receives the reference signal (e.g. indicated by azimuth angle and/or elevation angle). In a second method, the network (e.g. a BS or an entity in core network) may provide assistance data to the terminal (i.e., UE) that includes a mapping between angle information and beam index information, wherein the angle information includes azimuth angle information and/or elevation angle information and wherein the beam index information includes indices mapped to different angle information. The terminal (i.e., UE) decides which reception angle is used for each repetition. The terminal reports at least one of 1) the identity of the reference signal; 2) repetition index (i.e., on which repetition the measurement is based); 3) the beam index indication that indicates one of the indices indicating which of the angle information that the terminal receives the reference signal. In a third method, the network (e.g. a BS or an entity in core network) may provide assistance data to the terminal (i.e., UE) that includes a mapping between angle information and beam index information, wherein the angle information includes azimuth angle information and/or elevation angle information and wherein the beam index information includes indices mapped to different angle information. The assistance data also provides a mapping between beam index information and repetitions, wherein the beam index information includes indices mapped to different repetitions. The terminal reports at least one of 1) the identity of the reference signal; 2) repetition index (i.e., on which repetition the measurement is based). In a fourth method, the network (e.g. a BS or an entity in core network) may provide assistance data to the terminal (i.e., UE) that includes a mapping between angle information and repetitions, wherein the angle information includes azimuth angle information and/or elevation angle information and wherein the different repetitions are mapped to different angle information. The terminal reports at least one of 1) the identity of the reference signal; 2) repetition index (i.e., on which repetition the measurement is based). FIG. 3 is a table showing a mapping between angle information and repetitions according to the fourth method.

In addition, for a LCS, when the reference direction is decided by the terminal, the reference direction may be reported in one of the following ways 1) reception angle of one reference signal is indicated explicitly or implicitly with angle information that the azimuth angle is 0° and/or the elevation angle is 0°; 2) the measurement report may include the identity of the RS and the repetition index information (if repetition is configured and the repetition information is required to be reported) to indicate the reference direction, which indicates a reference direction that is the reception angle of the RS is received. For example, when the identity of the reference signal is 2 (if repetition is not considered), then the reference direction is the reception angle of the RS (with identity=2) is received. Alternatively, when the reference direction is decided by network, the reference direction may be indicated in one of the following ways: 1) reception angle of one reference signal is indicated explicitly or implicitly with angle information that the azimuth angle is 00 and/or the elevation angle is 0°; 2) the identity of the reference signal and the repetition index information (if repetition is configured) used as reference direction are indicated in assistance data, which indicates a reference direction that is the reception angle of the RS is received.

As discussed above, the terminal can report reception timing information in the measurement report, according to various embodiments. In each of the various embodiments, the measurement report includes at least one of but not limited to: an identity of reference signal and corresponding repetition index that indicated as a reference, reception time of reference signal indicated as the reference, relative timing differences, and identities of reference signal and corresponding repetition indices for deriving relative timing differences in addition to the indicated reference.

In some embodiments, the reception time of a RS is determined by a specific time when the RS is received according to the local clock of the terminal. Here, the specific time can be determined by the first detected path in time when the RS is received. In other embodiments, the reception time is defined as the beginning of the subframe determined by a specific time when the RS is received, wherein the subframe can be the subframe containing the RS, wherein the specific time can be determined by the first detected path in time when the RS is received. These determinations for reception time are applicable whether or not repetition is configured.

When repetition is not configured, the terminal may measure the reception time of different RS. FIG. 4 is a table showing RS and corresponding reception times, according to various embodiments. In one example involving an RS as a reference, the reference can be configured by network (e.g. a BS or an entity in core network) or decided by terminal. In this example, at least one of the following information may be reported in the measurement report: an identity of reference signal that is indicated as a reference (e.g., referring to FIG. 4, RS2), reception time of the reference signal indicated as the reference (e.g., referring to FIG. 4, $T_2$), relative timing differences between RS generally and the RS indicated as the reference (e.g., referring to FIG. 4, the relative timing difference between RS1 and RS2 is $T_{RS1\_RS2}$ $T_1-T_2$, while the relative timing difference between RS3 and RS2 is $T_{RS3\_RS2}=T_3-T_2$), and identities of reference signal for deriving relative timing differences in addition to the indicated reference. The relative timing difference may also be defined, in some embodiments, as the subframe boundary offset determined by two RS. For example, in these embodiments, $T_{RS1\_RS2}=T_1-T_2$, where $T_1$ is the beginning of subframe i determined by the first detected path in time of the received RS with identity equals to 1, and $T_2$ is the beginning of subframe j that is closest in time to the subframe i, and where the beginning of subframe j is determined by the first detected path in time of the received RS with identity equals to 2. The timing differences, as reported in the measurement report, may be required to always be larger than 0 (i.e., positive), and/or the total number of relative timing differences may be configured by the network.

When repetition is configured with repetitions over different time instants, the terminal may measure the reception time of different RS and different repetitions. FIG. 5 is a table showing RS and corresponding reception times for various repetitions, according to various embodiments. In a first embodiment in which repetition information is not required to be reported in the measurement report, the information reported in the measurement report is the same as when repetitions is not configured. In a second embodiment in which repetition information is required to be reported in the measurement report, the measurement report may report at least one of: an identity of reference signal and corresponding repetition index that indicated as a reference (e.g., referring to FIG. 5, the second repetition of RS2), reception time of reference signal indicated as the reference (e.g., referring to FIG. 5, $T_{22}$), relative timing differences between RS generally and the RS indicated as the reference, and identities of reference signal and corresponding repetition indices for deriving relative timing differences in addition to the indicated reference. FIG. 6 is a table showing relative timing differences between RS and the reference, according to various embodiments. Further, the relative timing difference may also be defined, in some embodiments, as the subframe boundary offset determined by two RS. For example, in these embodiments, $T_{RS11\_RS22}=T_{11}-T_{22}$ is the relative timing difference between reception time of the first repetition of RS1 and reception time of the reference, where $T_{11}$ is the beginning of subframe i determined by the first detected path in time of the received RS with identity equals to 1 in the first repetition, and $T_{22}$ is the beginning of subframe j that is closest in time to the subframe i, and where the beginning of subframe j is determined by the first detected path in time of the received RS with identity equals to 2 in the second repetition. The relative timing differences, as reported in the measurement report, may be required to always be larger than 0 (i.e., positive), and/or the total number of relative timing differences based on the same pair of RS may be configured by the network, and/or the total number of relative timing differences may be configured by the network.

As discussed herein, in an embodiment, all RS used in the reception beam information and reception timing information are transmitted from the same wireless communication node (e.g., base station/transmission-reception point/transmission point).

As discussed herein, in an embodiment, different RS are transmitted from multiple wireless communication nodes (e.g., transmission-reception points/transmission points), such that multiple wireless communication nodes may be controlled/served by (or associated with) the same control entity (e.g. base station/NG-RAN node/MAC entity/gNB-Centralized Unit (CU)). For example, there are multiple wireless communication nodes (e.g. transmission-reception points/transmission points) controlled/served by the same base station. In another example, multiple wireless communication nodes can be the nodes used in CoMP system in LTE or M-TRP system in 5G NR (including single-DCI based M-TRP and/or multi-DCI based M-TRP). The different transmission-reception points in 5G NR are differentiated by different coresetPoolIndex in high layer signaling or the number of TCI states in high layer signaling. In some deployment scenarios, the multiple transmission-reception points (i.e. multiple wireless communication nodes) in M-TRP system of 5G NR can be controlled/served by the same MAC entity. In a further example, each of the multiple wireless communication nodes is controlled/served by a gNB-DU, all gNB-DUs associated with wireless communication node are controlled/served by the same gNB-CU.

As discussed herein, in an embodiment, the RS indicated as reference direction in reception beam information and the RS indicated as reference (i.e. the reception time of the RS is the reference for deriving the relative time differences) in reception timing information can be the same RS.

As discussed herein, in an embodiment, the reference signal can be CSI-RS (Channel State Information Reference Signal).

As discussed herein, in an embodiment, the reference signal can be DL PRS (DownLink Positioning Reference Signal).

As discussed herein, in an embodiment, the measurement report can be reported by physical layer channels (e.g. PUCCH and PUSCH).

As discussed herein, in an embodiment, the measurement report can be reported to LMF (Location Management Function) entity in core network by high layer signaling (e.g. LPP (LTE Positioning Protocol) signaling).

The transmission beam information, reception beam information, and reception timing information can be used jointly for positioning the terminal (e.g., UE). FIG. 7 is a schematic diagram of a Base Station (BS) 710, a first virtual BS 711, a second virtual BS 712, and a terminal 720 in wireless communication, according to an example embodiment. The BS 710 may be a network (e.g. an entity in core network), and the terminal 720 may be User Equipment (UE). As shown in FIG. 7, the BS 710 transmits a first Reference Signal (RS) 741, a second RS 742, and a third RS 743 to the terminal 720. Each of the RS 741-743 are transmitted in different beam directions, denoted by $\Theta_1$ for the first RS 741, $\Theta_2$ for the second RS 742, and $\Theta_3$ for the third RS 743. Some of the RS transmitted by the BS 710 may be reflected by reflectors. For example in FIG. 7, the first RS 741 is reflected by a first reflector 731 and the third RS 743 is reflected by a second reflector 732 before reaching the terminal 720. The terminal 720 uses different reception beams for receiving the RS, denoted $\alpha_1$ for the first RS 741, $\alpha_2$ for the second RS 742, and $\alpha_3$ for the third RS 743.

Referring to FIG. 7, a method for positioning is at least as follows. First, based on the transmission beam information, reception beam information, and reception time of the second RS 742, a rough location of the UE 720 can be estimated. Second, based on the transmission beam information and reception beam information of the first RS 741 and the third RS 743 and the rough UE 720 location, the first virtual BS 711 and the second virtual BS 712 (or the first reflector 731 and the second reflector 732) can be found according to the reflection characteristics of electromagnetic waves. Third, according to the relative time difference of the reception timing information, the network (i.e., BS 710 or an entity in core network) can use Time Difference Of Arrival (TDOA) positioning method and Particle Swam Optimization (PSO) algorithm to adjust the estimated UE 720 location in order to improve positioning accuracy.

FIG. 8A is a flowchart diagram illustrating an example wireless communication method 800, according to various arrangements. Method 800 can be performed by a UE, and begins at 810 where the UE sends, to a BS, a message indicating reception information of a first one of a plurality of Downlink (DL) Reference Signals (RS). The reception information comprises at least one of reception beam information or reception timing information.

In some embodiments, the reception beam information includes an identity of the first DL RS, while in other embodiments, the reception beam information includes angle information that indicates a direction from which the UE receives the first DL RS. In these other embodiments, the first DL RS may include a plurality of repetitions, and the reception beam information further includes a repetition index indicating which of the repetitions and the corresponding angle information.

In some embodiments, the method 800 further includes receiving, from the BS, assistance data that includes mapping between angle information and beam index information. The beam index information includes indices mapped to different angle information. In some of these embodiments, the assistance data includes an identity of a third DL RS that is indicated, by the BS, as a reference, thereby causing the UE to indicate a reference direction in which the third DL RS is received. In other of these embodiments, the reception beam information includes at least one beam index indication that indicates one of the indices indicating which of the angle information that the UE receives the first DL RS. Here, the first DL RS may include a plurality of repetitions, and the reception beam information further includes at least a repetition index indicating which of the repetitions and the corresponding angle information indicating the direction from which the UE receives the repetition indicated by the repetition index of the first DL RS. Alternatively, the first DL RS includes a plurality of repetitions, and the assistance data further comprises the angle information or the index in the beam index information for each of the plurality of repetitions.

In some embodiments, the first DL RS includes a plurality of repetitions, and the reception beam information further includes at least a repetition index indicating which of the repetitions. In other embodiments, the reception timing information includes an identity of a second one of the plurality of DL RS that is indicated, by the UE or the BS, as a reference, and a reception time of the second DL RS. In some of these embodiments, the reception timing information further includes a time difference between a reception time of the first DL RS and the reception time of the second DL RS. In other of these embodiments, the reception timing information further includes a plurality of time differences between respective reception times of a subset of the DL RS and the reception time of the second DL RS. Here, the number of the subset of DL RS is configured by the BS. In still other of these embodiments, each of the DL RS includes a plurality of repetitions, and the reception timing information further includes a time difference between a reception time of one of the repetitions of the first DL RS and a reception time of one of the repetitions of the second DL RS. In further of these embodiments, each of the DL RS includes a plurality of repetitions, and the reception timing information further includes a plurality of time differences between respective reception times of one of the repetitions of a subset of the DL RS and a reception time of one of the repetitions of the second DL RS. The number of the subset of downlink reference signals is configured by the BS.

In some embodiments, the reception information includes an identity of a third DL RS that is indicated, by the UE, as a reference, thereby indicating a reference direction in which the third DL RS is received. Here, the plurality of DL RS (i.e., the first, second, and third DL RS) are all transmitted by the BS 720.

In some embodiments, the reception beam information comprises an identity of the third DL RS that is indicated as a reference, thereby indicating a reference time in which the third DL RS is received. Further, the reception timing information may include a fourth DL RS indicated as a reference, thereby indicating a reference time in which the fourth DL RS is received. The third DL RS and the fourth DL RS are the same.

FIG. 8B is a flowchart diagram illustrating an example wireless communication method 850, according to various arrangements. Method 800 can be performed by the network (e.g. a BS or an entity in core network), and begins at 860 where the BS receives, from a UE, a message indicating reception information of a first one of a plurality of Downlink (DL) Reference Signals (RS). The reception information comprises at least one of reception beam information or reception timing information.

In some embodiments, the reception beam information includes an identity of the first DL RS, while in other embodiments, the reception beam information includes angle information that indicates a direction from which the UE receives the first DL RS. In these other embodiments, the first DL RS may include a plurality of repetitions, and reception beam information further includes a repetition index indicating which of the repetitions and the corresponding angle information.

In some embodiments, the method 800 further includes sending, to the UE, assistance data that includes mapping between angle information and beam index information. The beam index information includes indices mapped to different angle information. In some of these embodiments, the assistance data includes an identity of a third DL RS that is indicated, by the BS, as a reference, thereby causing the UE to indicate a reference direction in which the third DL RS is received. In other of these embodiments, the reception beam information includes at least one beam index indication that indicates one of the indices indicating which of the angle information that the UE receives the first DL RS. Here, the first DL RS may include a plurality of repetitions, and the reception beam information further includes at least a repetition index indicating which of the repetitions and the corresponding angle information indicating the direction from which the UE receives the repetition indicated by the repetition index of the first DL RS. Alternatively, the first DL RS includes a plurality of repetitions, and the assistance data further comprises the angle information or the beam index in the beam index information for each of the plurality of repetitions.

In some embodiments, the first DL RS includes a plurality of repetitions, and the reception beam information further includes at least a repetition index indicating which of the repetitions. In other embodiments, the reception timing information includes an identity of a second one of a plurality of DL RS that is indicated, by the UE or the BS, as a reference, and a reception time of the second DL RS. In some of these embodiments, the reception timing information further includes a time difference between a reception time of the first DL RS and the reception time of the second DL RS. In other of these embodiments, the reception timing information further includes a plurality of time differences between respective reception times of a subset of the DL RS and the reception time of the second DLRS. Here, the number of the subset of DL RS is configured by the BS. In still other of these embodiments, each of the DL RS includes a plurality of repetitions, and the reception timing information further includes a time difference between a reception time of one of the repetitions of the first DL RS and a reception time of one of the repetitions of the second DL RS. In further of these embodiments, each of the DL RS includes a plurality of repetitions, and the reception timing information further includes a plurality of time differences between respective reception times of one of the repetitions of a subset of the DL RS and a reception time of one of the repetitions of the second DL RS. The number of the subset of downlink reference signals is configured by the BS.

In some embodiments, the reception information includes an identity of a third DL RS that is indicated, by the UE, as a reference, thereby indicating a reference direction in which the third DL RS is received. Here, the plurality of DL RS (i.e., the first, second, and third DL RS) are all transmitted by the BS 720.

In some embodiments, the reception beam information comprises an identity of the third DL RS that is indicated as a reference, thereby indicating a reference time in which the third DL RS is received. Further, the reception timing information may include a fourth DL RS indicated as a reference, thereby indicating a reference time in which the fourth DL RS is received. The third DL RS and the fourth DL RS are the same.

Figure 9A:
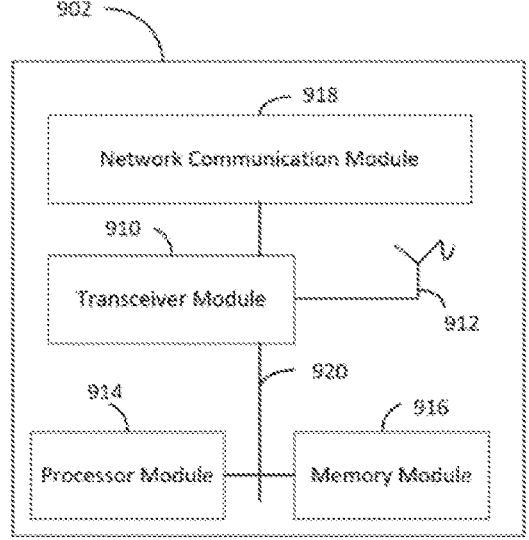
FIG. 9A illustrates a block diagram of an example base station, according to various embodiments.
Figure 9B:
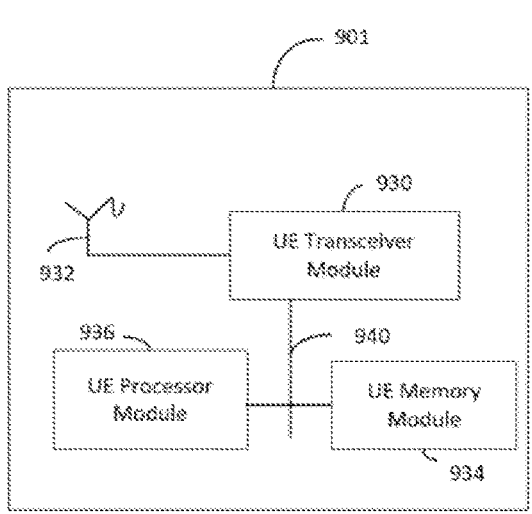
FIG. 9B illustrates a block diagram of an example user equipment, according to various embodiments.

FIG. 9A illustrates a block diagram of an example BS 902, in accordance with some embodiments of the present disclosure. FIG. 9B illustrates a block diagram of an example UE 901, in accordance with some embodiments of the present disclosure. The UE 901 (e.g., a wireless communication device, a terminal, a mobile device, a mobile user, and so on) is an example implementation of the UEs described herein, and the BS 902 is an example implementation of the BS described herein.

The BS 902 and the UE 901 can include components and elements configured to support known or conventional operating features that need not be described in detail herein. In one illustrative embodiment, the BS 902 and the UE 901 can be used to communicate (e.g., transmit and receive) data symbols in a wireless communication environment, as described above. For instance, the BS 902 can be a BS (e.g., gNB, eNB, and so on), a server, a node, or any suitable computing device used to implement various network functions.

The BS 902 includes a transceiver module 910, an antenna 912, a processor module 914, a memory module 916, and a network communication module 918. The module 910, 912, 914, 916, and 918 are operatively coupled to and interconnected with one another via a data communication bus 920. The UE 901 includes a UE transceiver module 930, a UE antenna 932, a UE memory module 934, and a UE processor module 936. The modules 930, 932, 934, and 936 are operatively coupled to and interconnected with one another via a data communication bus 940. The BS 902 communicates with the UE 901 or another BS via a communication channel, which can be any wireless channel or other medium suitable for transmission of data as described herein.

As would be understood by persons of ordinary skill in the art, the BS 902 and the UE 901 can further include any number of modules other than the modules shown in FIGS. 9A and 9B. The various illustrative blocks, modules, circuits, and processing logic described in connection with the embodiments disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The embodiments described herein can be implemented in a suitable manner for each particular application, but any implementation decisions should not be interpreted as limiting the scope of the present disclosure.

In accordance with some embodiments, the UE transceiver 930 includes a radio frequency (RF) transmitter and a RF receiver each including circuitry that is coupled to the antenna 932. A duplex switch (not shown) may alternatively couple the RF transmitter or receiver to the antenna in time duplex fashion. Similarly, in accordance with some embodiments, the transceiver 910 includes an RF transmitter and a RF receiver each having circuitry that is coupled to the antenna 912 or the antenna of another BS. A duplex switch may alternatively couple the RF transmitter or receiver to the antenna 912 in time duplex fashion. The operations of the two-transceiver modules 910 and 930 can be coordinated in time such that the receiver circuitry is coupled to the antenna 932 for reception of transmissions over a wireless transmission link at the same time that the transmitter is coupled to the antenna 912. In some embodiments, there is close time synchronization with a minimal guard time between changes in duplex direction.

The UE transceiver 930 and the transceiver 910 are configured to communicate via the wireless data communication link, and cooperate with a suitably configured RF antenna arrangement 912/1932 that can support a particular wireless communication protocol and modulation scheme. In some illustrative embodiments, the UE transceiver 930 and the transceiver 910 are configured to support industry standards such as the Long Term Evolution (LTE) and emerging 5G standards, and the like. It is understood, however, that the present disclosure is not necessarily limited in application to a particular standard and associated protocols. Rather, the UE transceiver 930 and the BS transceiver 910 may be configured to support alternate, or additional, wireless data communication protocols, including future standards or variations thereof.

The transceiver 910 and the transceiver of another BS (such as but not limited to, the transceiver 910) are configured to communicate via a wireless data communication link, and cooperate with a suitably configured RF antenna arrangement that can support a particular wireless communication protocol and modulation scheme. In some illustrative embodiments, the transceiver 910 and the transceiver of another BS are configured to support industry standards such as the LTE and emerging 5G standards, and the like. It is understood, however, that the present disclosure is not necessarily limited in application to a particular standard and associated protocols. Rather, the transceiver 910 and the transceiver of another BS may be configured to support alternate, or additional, wireless data communication protocols, including future standards or variations thereof.

In accordance with various embodiments, the BS 902 may be a BS such as but not limited to, an eNB, a serving eNB, a target eNB, a femto station, or a pico station, for example.

The BS 902 can be an RN, a DeNB, or a gNB. In some embodiments, the UE 901 may be embodied in various types of user devices such as a mobile phone, a smart phone, a personal digital assistant (PDA), tablet, laptop computer, wearable computing device, etc. The processor modules 914 and 936 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor modules 914 and 936, respectively, or in any practical combination thereof. The memory modules 916 and 934 may be realized as RAM memory, flash memory, ROM memory, EPROM memory, EEPROM memory, registers, a hard disk, a removable disk, a CD-ROM, or any other form of storage medium known in the art. In this regard, memory modules 916 and 934 may be coupled to the processor modules 914 and 936, respectively, such that the processors modules 914 and 936 can read information from, and write information to, memory modules 916 and 934, respectively. The memory modules 916 and 934 may also be integrated into their respective processor modules 914 and 936. In some embodiments, the memory modules 916 and 934 may each include a cache memory for storing temporary variables or other intermediate information during execution of instructions to be executed by processor modules 914 and 936, respectively. Memory modules 916 and 934 may also each include non-volatile memory for storing instructions to be executed by the processor modules 914 and 936, respectively.

The network communication module 918 generally represents the hardware, software, firmware, processing logic, and/or other components of the BS 902 that enable bidirectional communication between the transceiver 910 and other network components and communication nodes in communication with the BS 902. For example, the network communication module 918 may be configured to support internet or WiMAX traffic. In a deployment, without limitation, the network communication module 918 provides an 502.3 Ethernet interface such that the transceiver 910 can communicate with a conventional Ethernet based computer network. In this manner, the network communication module 918 may include a physical interface for connection to the computer network (e.g., Mobile Switching Center (MSC)). In some embodiments, the network communication module 918 includes a fiber transport connection configured to connect the BS 902 to a core network. The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method, comprising:
sending, by a wireless communication device to a wireless communication node, a message indicating reception information of a first downlink reference signal of a plurality of downlink reference signals,
wherein the reception information comprises reception beam information, wherein the reception beam information includes (i) angle information indicating a first direction from which the wireless communication device receives the first downlink reference signal, the first downlink reference signal having a plurality of repetitions, (ii) at least one repetition index indicating which of the plurality of repetitions through which the wireless communication device receives the first downlink reference signal, and (iii) at least one corresponding beam index indication, the angle information further indicating a second direction from which the wireless communication device receives a repetition indicated by the at least one repetition index of the first downlink reference signal; and receiving, by the wireless communication device from the wireless communication node, assistance data comprising a mapping between angle information and beam index information, the beam index information comprising indices mapped to different angle information, wherein the at least one corresponding beam index indication indicates one of the indices indicating which of the angle information that the wireless communication device receives the first downlink reference signal.

2. The wireless communication method of claim 1, wherein the reception beam information includes an identity of the first downlink reference signal.

3. The wireless communication method of claim 1, wherein the first downlink reference signal includes the plurality of repetitions, and wherein the assistance data further comprises at least one of the angle information or a repetition index in the beam index information for each of the plurality of repetitions.

4. The wireless communication method of claim 1, wherein the reception information further comprises reception timing information including an identity of a second one of the plurality of downlink reference signals that is indicated, by the wireless communication node or the wireless communication device, as a reference, and a reception time of the second downlink reference signal.

5. The wireless communication method of claim 4, wherein the reception timing information further includes a time difference between a reception time of the first downlink reference signal and the reception time of the second downlink reference signal.

6. The wireless communication method of claim 4, wherein the reception timing information further includes a plurality of time differences between respective reception times of a subset of the plurality of downlink reference signals and the reception time of the second downlink reference signal, and wherein a number of the subset of downlink reference signals is configured by the wireless communication node.

7. The wireless communication method of claim 4, wherein each of the plurality of downlink reference signals includes the plurality of repetitions, and wherein the reception timing information further includes a time difference between a reception time of one of the plurality of repetitions of the first downlink reference signal and a reception time of one of the plurality of repetitions of the second downlink reference signal.

8. The wireless communication method of claim 4, wherein each of the plurality of downlink reference signals includes the plurality of repetitions, and wherein the reception timing information further includes a plurality of time differences between respective reception times of one of the plurality of repetitions of a subset of the plurality of downlink reference signals and a reception time of one of the plurality of repetitions of the second downlink reference signal, and wherein a number of the subset of downlink reference signals is configured by the wireless communication node.

9. The wireless communication method of claim 1, wherein the reception information further comprises an identity of a third one of the plurality of downlink reference signals that is indicated, by the wireless communication device, as a reference, thereby indicating a reference direction in which the third downlink reference signal is received.

10. The wireless communication method of claim 9, wherein the plurality of downlink reference signals are all transmitted by the wireless communication node.

11. The wireless communication method of claim 1, wherein the assistance data further comprises:

an identity of a third one of the plurality of downlink reference signals that is indicated, by the wireless communication node, as a reference, thereby causing the wireless communication device to indicate a reference direction in which the third downlink reference signal is received.

12. A wireless communication device, comprising:

at least one processor configured to:

send, via a transmitter to a wireless communication node, a message indicating reception information of a first downlink reference signal of a plurality of downlink reference signals, wherein the reception information comprises reception beam information, wherein the reception beam information includes (i) angle information indicating a first direction from which the wireless communication device receives the first downlink reference signal, the first downlink reference signal having a plurality of repetitions, (ii) at least one repetition index indicating which of the plurality of repetitions through which the wireless communication device receives the first downlink reference signal, and (iii) at least one corresponding beam index indication, the angle information further indicating a second direction from which the wireless communication device receives a repetition indicated by the at least one repetition index of the first downlink reference signal; and receive, via a receiver from the wireless communication node, assistance data comprising a mapping between angle information and beam index information, the beam index information comprising indices mapped to different angle information, wherein the at least one corresponding beam index indication indicates one of the indices indicating which of the angle information that the wireless communication device receives the first downlink reference signal.

13. A wireless communication method, comprising:

receiving, by a wireless communication node from a wireless communication device, a message indicating reception information of a first downlink reference signal of a plurality of downlink reference signals, wherein the reception information comprises reception beam information, wherein the reception beam information includes (i) angle information indicating a first direction from which the wireless communication device receives the first downlink reference signal, the first downlink reference signal having a plurality of repetitions, (ii) at least one repetition index indicating which of the plurality of repetitions through which the wireless communication device receives the first downlink reference signal, and (iii) at least one corresponding beam index indication, the angle information further indicating a second direction from which the wireless communication device receives a repetition indicated by the at least one repetition index of the first downlink reference signal; and sending, by the wireless communication node to the wireless communication device, assistance data comprising a mapping between angle information and beam index information, the beam index information comprising indices mapped to different angle information, wherein the at least one corresponding beam index indication indicates one of the indices indicating which of the angle information that the wireless communication device receives the first downlink reference signal.

14. A wireless communication node, comprising:

at least one processor configured to:

receive, via a receiver from a wireless communication device, a message indicating reception information of a first downlink reference signal of a plurality of downlink reference signals, wherein the reception information comprises reception beam information, wherein the reception beam information includes (i) angle information indicating a first direction from which the wireless communication device receives the first downlink reference signal, the first downlink reference signal having a plurality of repetitions, (ii) at least one repetition index indicating which of the plurality of repetitions through which the wireless communication device receives the first downlink reference signal, and (iii) at least one corresponding beam index indication, the angle information further indicating a second direction from which the wireless communication device receives a repetition indicated by the at least one repetition index of the first downlink reference signal; and sending, by a transceiver to the wireless communication device, assistance data comprising a mapping between angle information and beam index information, the beam index information comprising indices mapped to different angle information, wherein the at least one corresponding beam index indication indicates one of the indices indicating which of the angle information that the wireless communication device receives the first downlink reference signal.

* * * * *